F. W. WRIGHT.
CARRIAGE BRAKE.
APPLICATION FILED OCT. 30, 1909.

997,531.

Patented July 11, 1911.
2 SHEETS—SHEET 1.

WITNESSES:
Fred White
René Bruine

INVENTOR:
Frederic W. Wright,
By Attorneys,

COLUMBIA PLANOGRAPH CO., WASHINGTON, D. C.

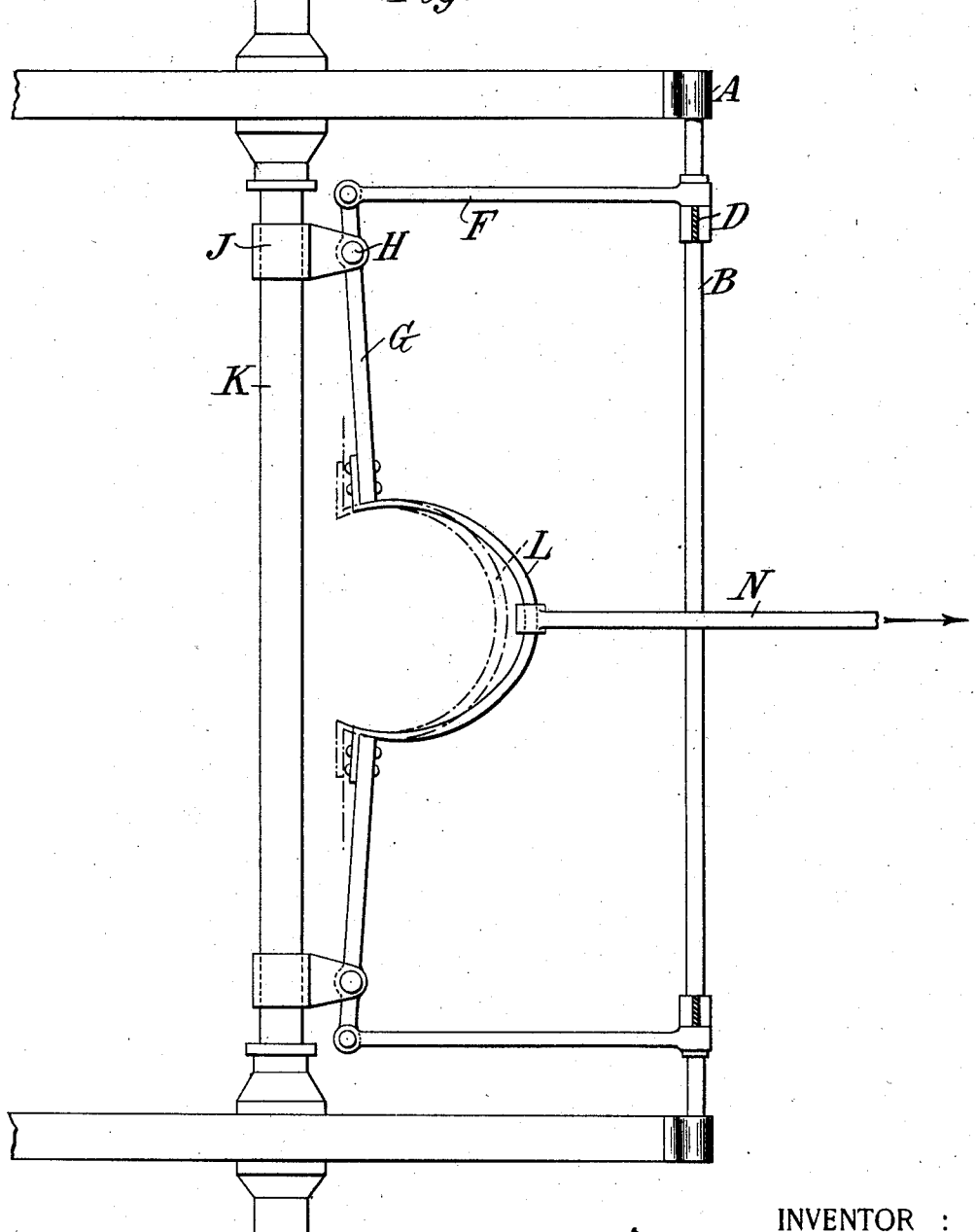

UNITED STATES PATENT OFFICE.

FREDERIC W. WRIGHT, OF COCKEYSVILLE, MARYLAND.

CARRIAGE-BRAKE.

997,531.  Specification of Letters Patent.  Patented July 11, 1911.

Application filed October 30, 1909. Serial No. 525,475.

*To all whom it may concern:*

Be it known that I, FREDERIC W. WRIGHT, a citizen of the United States, residing at Cockeysville, in the county of Baltimore and State of Maryland, have invented certain new and useful Improvements in Carriage-Brakes, of which the following is a specification.

The present invention aims to provide certain improvements which are especially though not exclusively adapted to a carriage brake and which render the brake compact, simple, easy of application to carriages of existing designs and extremely quiet, or free from rattling.

In the preferred form of the invention the brakes are applied by means of levers supported from the axle carrying the wheels to be braked and at points near the ends of this axle, and a spring or springs are provided by which the parts are maintained in their normal positions and by which all looseness of the connections is taken up so as to prevent rattling.

The accompanying drawings illustrate an embodiment of the invention.

Figure 1:
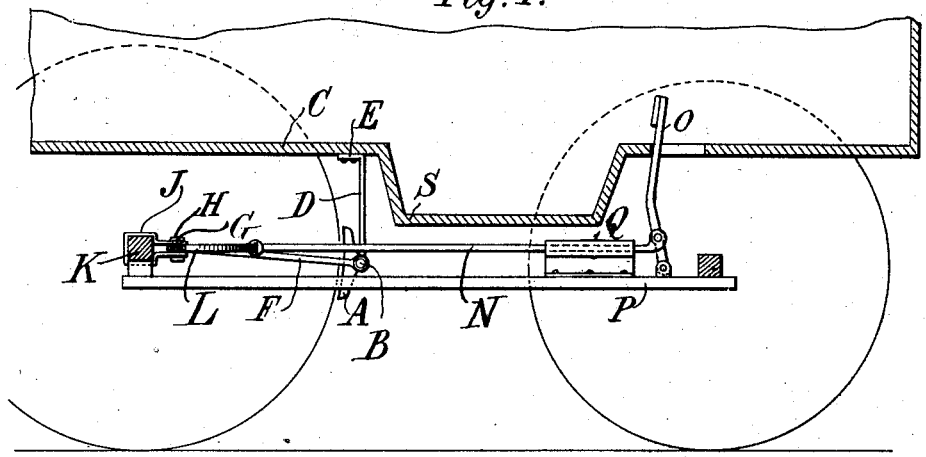
Figure 2:
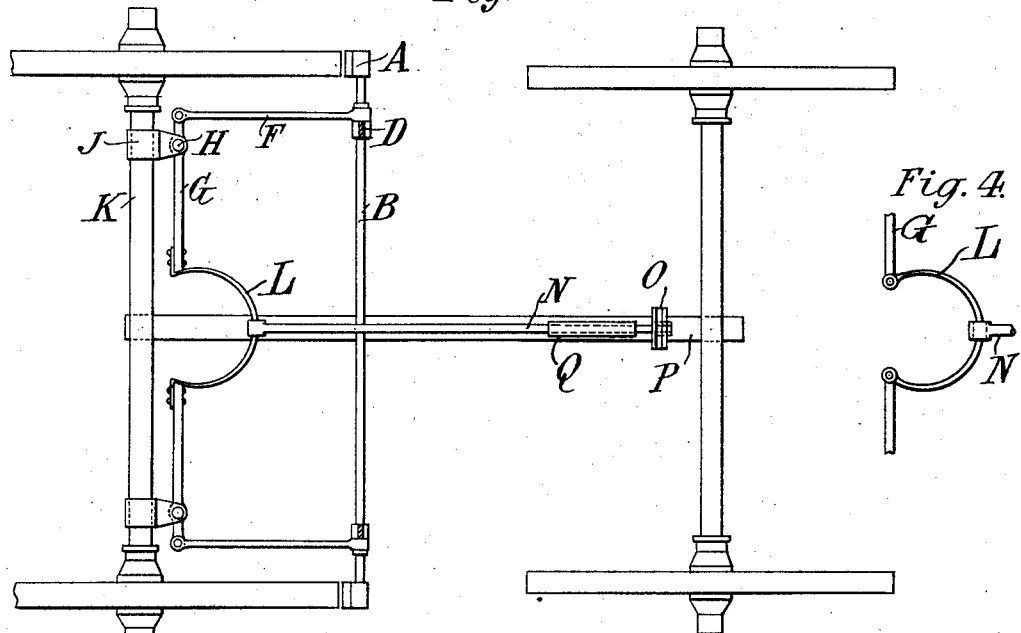
Figure 3:
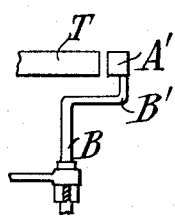

Figure 1 is a side elevation partly in section of the brake applied to the under side of a carriage; Fig. 2 is a plan thereof partly in section; Fig. 3 is a modified detail in plan; Fig. 4 is a plan of a modified detail; Fig. 5 is a plan similar to Fig. 2 with the brakes applied.

On account of the variety of ways in which light wagons and carriages, for which this invention is especially designed, are built, the variety of shapes of the bodies and the reach and its braces, and the manner of placing the bodies on the running gear, it is necessary to modify the design of the brake considerably for different cases. Brakes built in accordance with the principles of this invention, however, are applicable to all or nearly all forms of wagon or carriage.

Referring to the embodiment of the invention illustrated, the brake shoes A are carried upon opposite ends of a brake beam B extending transversely under the elevated rear portion of the floor C of the carriage, this elevated rear portion being found in nearly all carriages. The brake beam is supported in position by means of flexible vertical rods D attached to the body of the carriage, as by extending them vertically and fastening them by means of a flange E (Fig. 1) to the under side of the floor. These supporting rods D are preferably of spring metal so that they may be made quite small and yet have sufficient strength to resist the downward pull upon the brake beam when the shoes are brought against the wheel. The braking action is secured by a rod F, preferably also of light spring metal, attached near the end of the beam D and running back to a lever G which is pivoted at H between a pair of plates J carried at the top and bottom of the axle K. The mechanism is duplicated at opposite sides, and the inner ends of the levers G are connected to the controlling lever by means of a steel bow spring L which is connected by a link N to the pedal O or the like pivoted upon the reach P, or other suitable part of the wagon, and extending upward to a point within reach of the driver's foot. The link N may be guided in a tube Q arranged along the top of the reach P at a suitable point. When the pedal is released the brake shoes are withdrawn by the spring of the bow L which also forces out the rods F and the brake beam and shoes. This bow spring serves also to distribute the pulling strain to the two levers G so that the pressure of the two brakes is substantially or approximately equalized. Instead of being rigidly attached to the levers, the bow spring L may be pivotally connected thereto as in Fig. 4 for better equalization of the stresses. This construction not only provides a mechanism which is flat so that it can be placed under a very low body, but also secures a good leverage and can be very easily and firmly applied to existing carriages.

Where the depressed portion S of the body of the carriage is quite far to the rear, the construction described permits of locating the brake beam correspondingly far to the rear, so as to avoid interference and come under the higher part of the wagon body. For example as shown in Fig. 3 the beam B is located a substantial distance to the rear of the forward edge of the wheel T and to the rear of the brake shoe A', which for this purpose is connected by a bend B' to the end of the beam.

Fig. 5 shows the manner in which the spring L is distorted when the brakes are applied. The dotted lines show the normal shape of the spring, to which it tends always to return. The tendency of this spring to return to its normal shape serves several highly advantageous purposes. It retracts the pedal when the latter is released, the intermediate portion of the spring pulling always back toward the rear axle. It throws the brake shoes forward away from the wheel-rims by reason of the movement of the ends of the spring toward each other, which can only be effected by a rearward movement of the inner arms of the levers G and a corresponding forward movement of the brake shoes. It is so shaped originally as to be still under some strain when in the "brakes-off" position; and thus pulls the pedal backward and pulls the levers G toward the center of the axle, so as to prevent rattling at all points from the pedal to the pivots H. Furthermore, by its flexibility the spring L serves to equalize the strain on the two brake shoes and levers notwithstanding slight differences between the two sides. The bow spring thus acts as an equalizer, as a spring or springs pulling the ends of the two levers toward their normal positions, and as two springs each connecting the pedal to one of the brake actuating levers G. The rigid attachment of the spring to the levers and to the link gives further assurance against rattling.

Rattling of the joints between the links F and levers G is prevented by the springs D which always exert a strain in the lines of the links.

The spring L or any complete or partial equivalent therefor may be applied not only to the style of brake shoes and connections illustrated, but to various other styles.

What I claim is:—

1. A vehicle brake comprising in combination a brake beam B extending across between the wheels and carrying shoes adapted to engage the rims of the wheels, supporting members J mounted directly on the rear axle at points near its ends, levers G located close to said axle, pivoted upon said supports and having short outer and long inner arms, links F extending from said short outer arms to said beam, a bow spring between the inner ends of said levers drawing them together, a pedal and means connecting said pedal to said bow spring and through said bow spring to said levers for actuating said levers to put on the brake.

2. A vehicle brake comprising in combination a brake beam B extending across between the wheels and carrying shoes adapted to engage the rims of the wheels, supporting members J mounted directly on the axle at points near its ends, levers G located close to said axle, pivoted upon said supports and having short outer and long inner arms, links F extending from said short outer arms to said beam, a bow spring L having its ends connected to the inner ends of said levers drawing them together, and a pedal and means connecting said pedal to the middle of said bow spring and through said bow spring to said levers for actuating said levers to put on the brake.

3. A vehicle brake comprising in combination a pair of levers G, a bow spring L connected at its ends to said levers, and an operating rod connected to an intermediate point of said bow spring, said bow spring tending by its shape to maintain said levers in position to retract the brakes and to maintain the operating rod retracted.

In witness whereof, I hereunto signed my name in the presence of two subscribing witnesses.

FREDERIC W. WRIGHT.

Witnesses:
 D. ANTHONY USINA,
 FRED WHITE.

---

Copies of this patent may be obtained for five cents each, by addressing the "Commissioner of Patents, Washington, D. C."